United States Patent
Tsai et al.

(10) Patent No.: US 12,094,096 B2
(45) Date of Patent: Sep. 17, 2024

(54) METHOD AND DEVICE FOR DETECTING DEFECTS, ELECTRONIC DEVICE USING METHOD, AND NON-TRANSITORY STORAGE MEDIUM

(71) Applicant: HON HAI PRECISION INDUSTRY CO., LTD., New Taipei (TW)

(72) Inventors: Tung-Tso Tsai, New Taipei (TW); Chin-Pin Kuo, New Taipei (TW); Tzu-Chen Lin, New Taipei (TW); Shih-Chao Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 436 days.

(21) Appl. No.: 17/564,504

(22) Filed: Dec. 29, 2021

(65) Prior Publication Data
US 2022/0207695 A1  Jun. 30, 2022

(30) Foreign Application Priority Data
Dec. 30, 2020 (CN) .......................... 202011613567.8

(51) Int. Cl.
*G06T 7/00* (2017.01)
*G06V 10/774* (2022.01)
*G06V 10/82* (2022.01)

(52) U.S. Cl.
CPC .......... *G06T 7/0002* (2013.01); *G06V 10/774* (2022.01); *G06V 10/82* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| 11,449,711 B2 * | 9/2022 | Badanes ................. G06T 7/001 |
| 2017/0123411 A1 | 5/2017 | Cheng et al. |
| 2021/0209410 A1 * | 7/2021 | Pan ..................... G01N 21/9501 |
| 2021/0358115 A1 * | 11/2021 | Hever .................. G06T 7/0008 |
| 2022/0028052 A1 | 1/2022 | Li et al. |

FOREIGN PATENT DOCUMENTS

| TW | 201717057 A | 5/2017 |
| TW | 202043911 A | 12/2020 |

* cited by examiner

*Primary Examiner* — Leon Viet Q Nguyen
(74) *Attorney, Agent, or Firm* — ScienBiziP, P.C.

(57) ABSTRACT

In a method for defecting surface defects, a weighting generated when defect-free training samples are used to train an autoencoder and pixel convolutional neural network is obtained. A test encoding feature is obtained by inputting the weighting into the autoencoder and pixel convolutional neural network and encoding a test sample with a weighted autoencoder of the weighted autoencoder and pixel convolutional neural network. The test encoding feature is divided into many sub-test encoding features. The sub-test encoding features are input into a weighted pixel convolution neural network of the weighted autoencoder and pixel convolutional neural network one by one to output a result of test, the test result being either no defect in the test sample or at least one defect in the test sample. Inaccurate defect determinations are avoided, and accurate determinations even of fine defects improved. An electronic device and a non-transitory storage medium are also disclosed.

20 Claims, 5 Drawing Sheets

METHOD AND DEVICE FOR DETECTING DEFECTS, ELECTRONIC DEVICE USING METHOD, AND NON-TRANSITORY STORAGE MEDIUM

FIELD

The subject matter herein generally relates to quality control, particularly to a method and a device for detecting defects, an electronic device using method, and a non-transitory storage medium.

BACKGROUND

To detect defects, a sample is input into a trained autoencoder to construct an image corresponding to the sample, and whether or not the sample has defects is determined according to a difference between the constructed image and the sample. However, noise may be included in the sample, thus the determination of defects may be inaccurate, and detection of fine defects is problematic.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
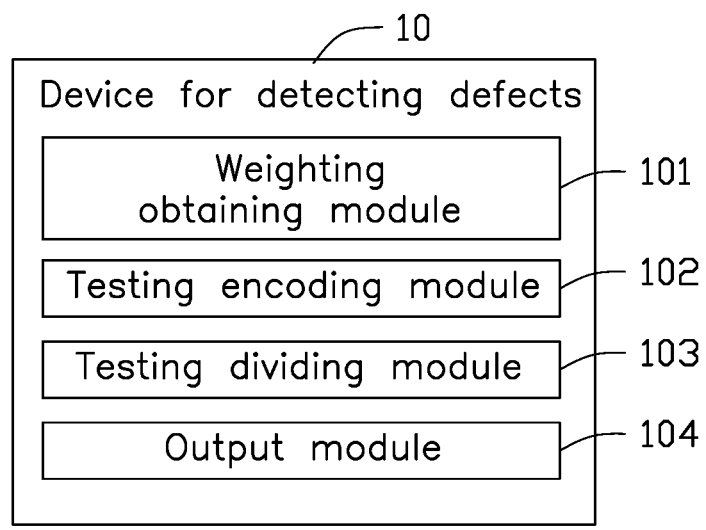
FIG. 1 illustrates a block diagram of a device for detecting defects in a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

FIG. 1 illustrates a device for detecting defects in a first embodiment. The device for detecting defects 10 can be applied in an electronic device. The electronic device can be a smart phone, a desktop computer, a tablet computer, or the like. The device for detecting defects 10 can include a weighting obtaining module 101, a testing encoding module 102, a testing dividing module 103, and an output module 104. The weighting obtaining module 101 is configured to obtain a weighting generated when an autoencoder and pixel convolutional neural network is being trained with a number of defect-free training samples. The testing encoding module 102 is configured to input the weighting into the autoencoder and pixel convolutional neural network to obtain a test encoding feature by a weighted autoencoder of the weighted autoencoder and pixel convolutional neural network encoding a test sample. The testing dividing module 103 is configured to divide the test encoding feature into a number of sub-test encoding features. The output module 104 is configured to input the sub-test encoding features into a weighted pixel convolution neural network of the weighted autoencoder and pixel convolutional neural network one by one to output a test result. The test result can be either no defect in the test sample or at least one defect in the test sample.

Figure 2:
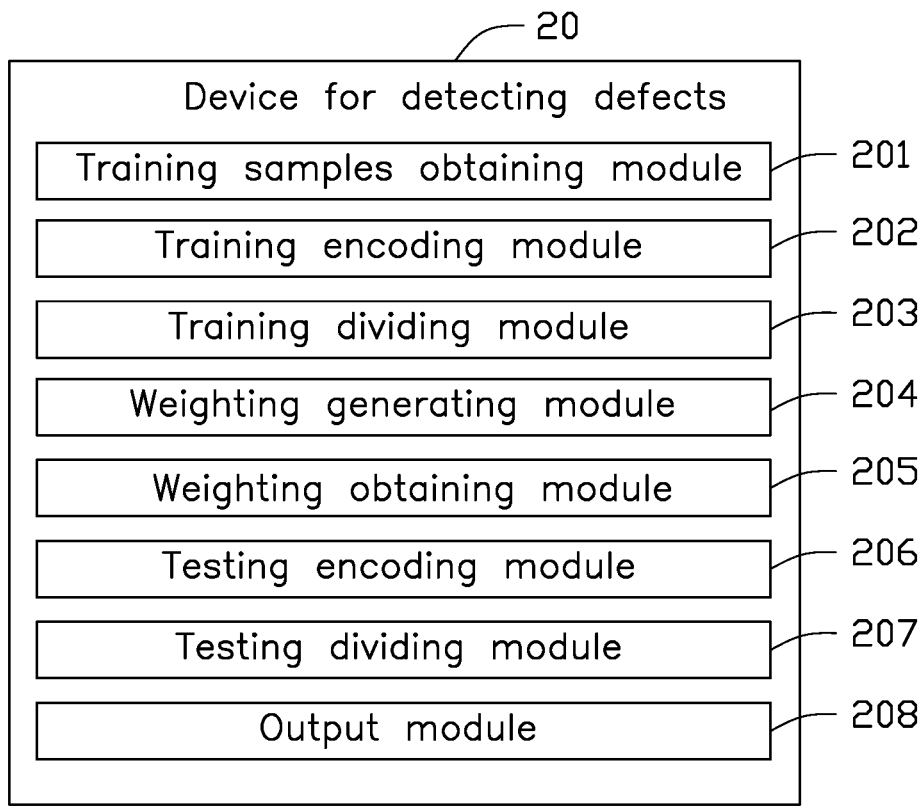
FIG. 2 illustrates a block diagram of a device for detecting defects in a second embodiment of the present disclosure.

FIG. 2 illustrates a block diagram of a device for detecting defects in a second embodiment. The device for detecting defects 20 can be applied in an electronic device. The electronic device can be a smart phone, a desktop computer, a tablet computer, or the like. The device for detecting defects 20 can include a training samples obtaining module 201, a training encoding module 202, a training dividing module 203, a weighting generating module 204, a weighting obtaining module 205, a testing encoding module 206, a testing dividing module 207, and an output module 208. The training samples obtaining module 201 is configured to obtain a number of defect-free training samples. The training encoding module 202 is configured to input the defect-free training samples into an autoencoder of an autoencoder and pixel convolutional neural network to obtain a number of training encoding features by the autoencoder encoding the defect-free training samples. The training dividing module 203 is configured to divide each of the training encoding features into a number of sub-training encoding features. The weighting generating module 204 is configured to perform training by inputting the sub-training encoding features into a pixel convolutional neural network of the autoencoder and pixel convolutional neural network to generate a weighting of the autoencoder and pixel convolutional neural network. The weighting obtaining module 205 is configured to obtain the weighting generated when the autoencoder and pixel convolutional neural network is being trained with the defect-free training samples. The testing encoding module 206 is configured to input the weighting into the autoencoder and pixel convolutional neural network to obtain a test encoding feature by a weighted autoencoder of the weighted autoencoder and pixel convolutional neural network encoding a test sample. The testing dividing module 207 is configured to divide the test encoding feature into a number of sub-test encoding features. The output module 208 is configured to input the sub-test encoding features into a weighted pixel convolution neural network of the weighted autoencoder and pixel convolutional neural network one by one to output a test result. The test result can be either no defect in the test sample or at least one defect in the test sample.

Details of the functions of the modules 101~104 and modules 201~208 will be described.

Figure 3:
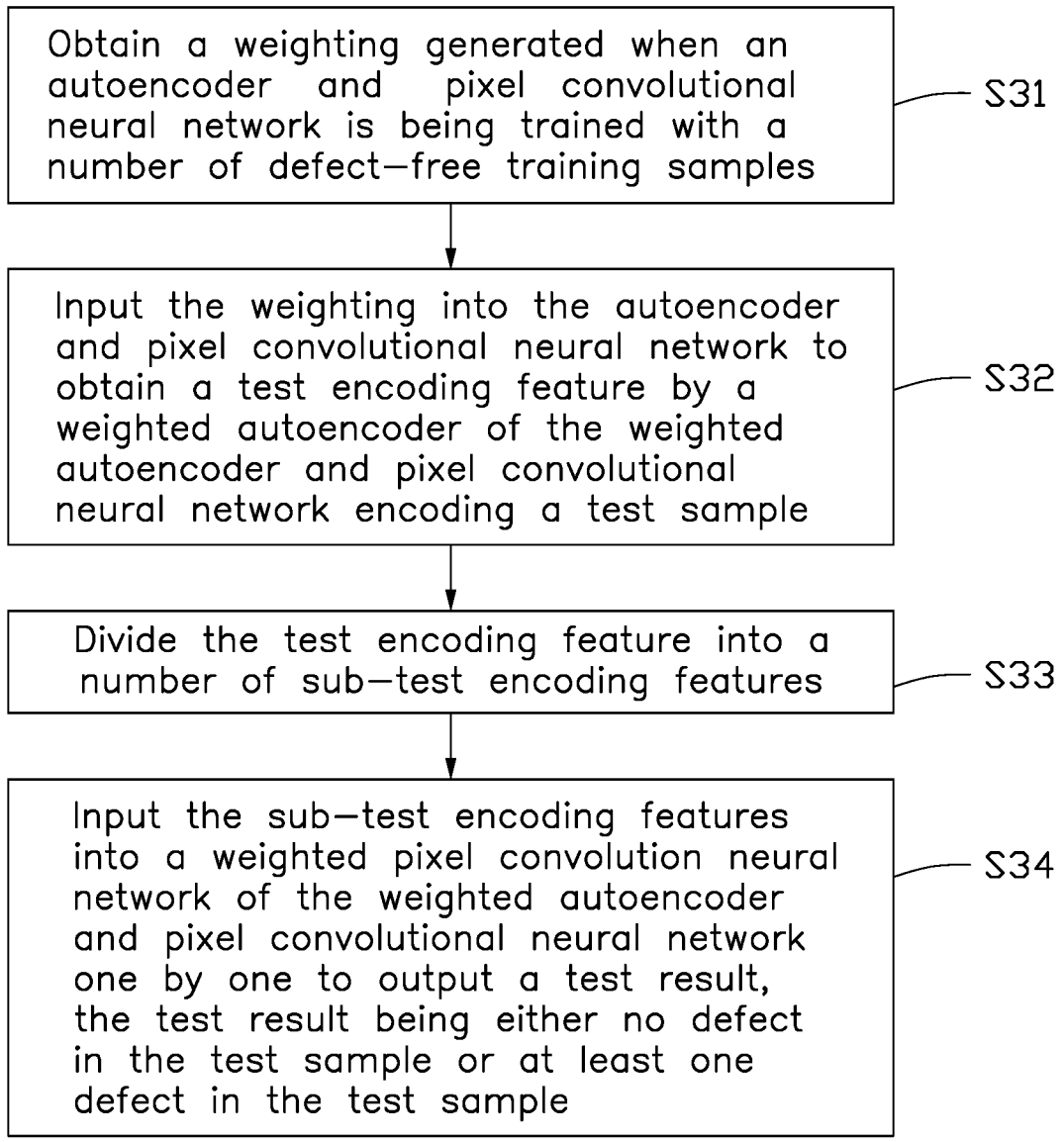
FIG. 3 illustrates a flowchart of a method for detecting defects in a first embodiment of the present disclosure.

FIG. 3 is a flowchart of a method for detecting defects in a first embodiment. The method for detecting defects can include the following:

At block S31, obtaining a weighting generated when an autoencoder and pixel convolutional neural network is being trained with a number of defect-free training samples.

The defect-free training samples are images of a defect-free surface of a product. The autoencoder and pixel convolutional neural network is an architecture of the autoencoder based on the pixel convolutional neural network, namely an architecture of the autoencoder with the pixel convolutional neural network added. The weighting is an optimal weighting when training the architecture of the autoencoder based on the pixel convolutional neural network.

At block S32, inputting the weighting into the autoencoder and pixel convolutional neural network to obtain a test encoding feature by a weighted autoencoder of the weighted autoencoder and pixel convolutional neural network encoding a test sample.

The autoencoder can include an encoder. The test encoding feature is a feature generated when the test sample is being encoded by the encoder of the weighted autoencoder of the weighted autoencoder and pixel convolutional neural network, namely a feature of a hidden layer. The test encoding feature is the essence of the test sample, and noise of the test sample is removed. The inputting the weighting into the autoencoder and pixel convolutional neural network generates a trained architecture of the autoencoder based on the pixel convolutional neural network, namely a weighted autoencoder and pixel convolutional neural network are thereby generated. The test sample is a test image of the surface of the product.

At block S33, dividing the test encoding feature into a number of sub-test encoding features.

The dividing of the test encoding feature into a number of sub-test encoding features includes a step a1, a step a2, and a step a3. The step a1 includes determining a length of the test encoding feature. The step a2 includes obtaining a preset condition of the divisions required, the preset condition being either a preset length or a preset number. The step a3 includes dividing the length of the test encoding feature into the number of sub-test encoding features according to the preset condition.

At block S34, inputting the sub-test encoding features into a weighted pixel convolution neural network of the weighted autoencoder and pixel convolutional neural network one by one to output a test result, the test result being either no defect in the test sample or at least one defect in the test sample.

In the embodiment, the pixel convolution neural network includes a convolution kernel, a number of convolution layers, a number of residual modules, and a softmax layer. The convolution kernel, the residual modules, the convolution layers, and the softmax layer are connected in sequence. The convolution kernel is the convolution kernel with a size of 7×7. The pixel convolutional neural network can extract a feature of the sub-test encoding feature via the convolution kernel with the size of 7×7 connecting with the input sub-test encoding feature. The residual modules are configured to process the extracted feature of the sub-test encoding feature. Each of the convolution layers is a convolution layer with a size of 1×1. In the embodiment, two convolution layers with a size of 1×1 are employed. An output layer of the pixel convolution neural network is the softmax layer. The pixel convolution neural network outputs the probability value via the softmax layer.

The inputting of the sub-test encoding features into the weighted pixel convolution neural network of the weighted autoencoder and pixel convolutional neural network one by one to output the test result includes a step b1 and a step b2. The step b1 includes inputting the sub-test encoding features into a weighted pixel convolution neural network of the weighted autoencoder and pixel convolutional neural network one by one to output a number of probability values. The step b2 includes outputting the test result according to the probability values. In the embodiment, if any one probability value of the sub-test encoding feature approaches 1, the test result will be that there is at least one defect in the test sample. If each of the probability values of the sub-test encoding feature approaches 0, the test result will be that there is no defect in the test sample. For a probability value approaching 1, the probability value preferred is 1, 0.99, 0.98, or other value according to specific requirements. For a probability value approaching 0, the probability value preferred is 0, 0.01, 0.02, or other value according to specific requirements.

In the embodiment, the inputting of the sub-test encoding features into the weighted pixel convolution neural network of the weighted autoencoder and pixel convolutional neural network one by one to output a test result includes a step c1 and a step c2. The step c1 includes inputting the sub-test encoding features into the weighted pixel convolution neural network of the weighted autoencoder and pixel convolutional neural network one by one until all of the sub-test encoding features are tested completely or there is a determination that at least one defect exists in the sub-test encoding feature. The step c2 includes outputting the test result.

In the embodiment, the inputting of the sub-test encoding features into the weighted pixel convolution neural network of the weighted autoencoder and pixel convolutional neural network one by one until all of the sub-test encoding features are tested completely or there is a determination that at least one defect exists in the sub-test encoding feature includes a step d1, a step d2, a step d3, and a step d4. The step d1 includes inputting one sub-test encoding feature into a weighted pixel convolution neural network of the weighted autoencoder and pixel convolutional neural network to output a sub-test result. The step d2 includes determining whether at least one defect exists in the sub-test encoding feature according to the sub-test result. The step d3 includes determining whether all of the sub-test encoding features are tested completely if no defect is found in the sub-test encoding feature. The step d4 includes if not all of the sub-test encoding features are tested completely, inputting continuously a next sub-test encoding feature into the weighted pixel convolution neural network of the weighted autoencoder and pixel convolutional neural network, determining whether at least one defect exists in the next sub-test encoding feature, and determining whether all of the sub-test encoding features are tested completely, until all of the sub-test encoding features are tested completely or there is a determination that at least one defect exists in the sub-test encoding feature.

For example, the method inputs a sub-test encoding feature 1 into the weighted pixel convolution neural network of the weighted autoencoder and pixel convolutional neural network to output a probability value of 0. A determination that no defect exists in the sub-test encoding feature 1 is made according to the probability value of 0. The method further determines that not all of the sub-test encoding features are tested completely. Then the method inputs a sub-test encoding feature 2 into the weighted pixel convolution neural network of the weighted autoencoder and pixel convolutional neural network to output a probability value of 1, and determines that at least one defect exists in the sub-test encoding feature 2 according to the probability value of 1.

In the embodiment, the method further includes a step e1. The step e1 includes outputting a test result including at least one defect in the test sample if there is a determination that at least one defect exists in the sub-test encoding feature.

In the embodiment, the method further includes a step f1. The step f1 includes if all of the sub-test encoding features are tested completely, outputting a test result including no defect in the test sample.

In the embodiment, the inputting of the sub-test encoding features into the weighted pixel convolution neural network of the weighted autoencoder and pixel convolutional neural network one by one to output the test result includes a step g1. The step g1 includes performing testing one by one by inputting all of the sub-test encoding features into the weighted pixel convolution neural network of the weighted autoencoder and pixel convolutional neural network one by one to output the test result. For example, all of the sub-test encoding features include a sub-test encoding feature 1 and a sub-test encoding feature 2. The method inputs the sub-test encoding feature 1 into the weighted pixel convolution neural network of the weighted autoencoder and pixel convolutional neural network to output a probability value 1. Then the method inputs the sub-test encoding feature 2 into the weighted pixel convolution neural network of the weighted autoencoder and pixel convolutional neural network to output a probability value 2. The method further outputs the test result according to the probability value 1 and the probability value 2.

In the disclosure, a weighting generated when an autoencoder and pixel convolutional neural network is being trained with defect-free training samples is obtained. The disclosure obtains a test encoding feature by inputting the weighting into the autoencoder and pixel convolutional neural network and encoding a test sample by a weighted autoencoder of the weighted autoencoder and pixel convolutional neural network. The disclosure divides the test encoding feature into a number of sub-test encoding features. The disclosure inputs the sub-test encoding features into a weighted pixel convolution neural network of the weighted autoencoder and pixel convolutional neural network one by one to output a test result. The test result can be either that there is no defect in the test sample or that there is at least one defect in the test sample. Thus, the disclosure can directly use essence of the test sample to determine whether a defect exists in the test sample, but not directly use the test sample to determine whether a defect exists. According to this disclosure, the test sample does not need to be compared. Thus, any influence of noise of the test sample is avoided, and an accuracy of determination of a defect which exists is improved. The disclosure divides the test encoding feature into a number of sub-test encoding features to perform testing, thus interference in the test encoding feature and an averaging of information as to defects are avoided, thus even very fine defects can be accurately determined.

Figure 4:
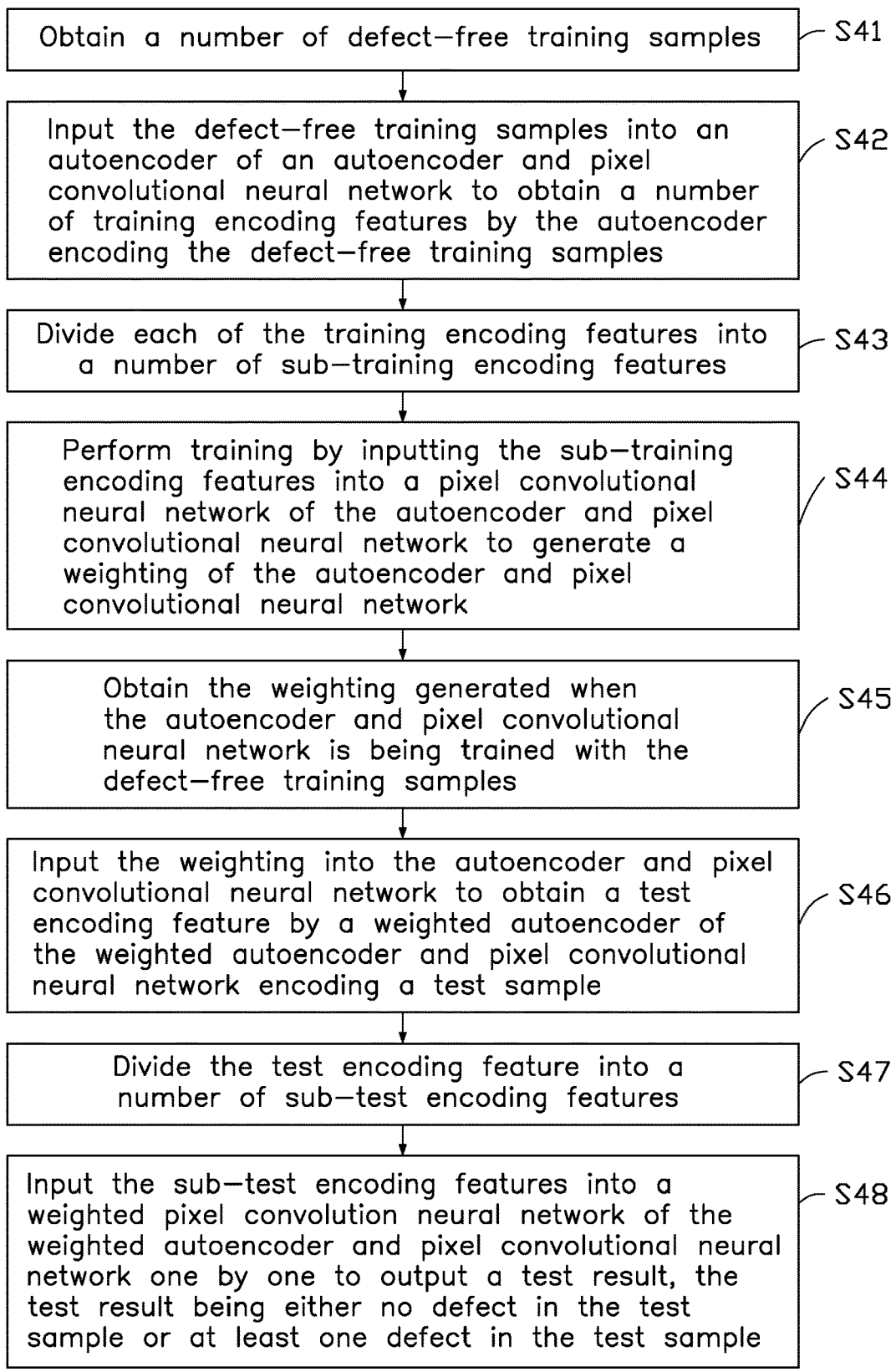
FIG. 4 illustrates a flowchart of a method for detecting defects in a second embodiment of the present disclosure.

FIG. 4 is a flowchart of a method for detecting defects in a second embodiment. This method for detecting defects can include the following:

At block S41, obtaining a number of defect-free training samples.

The defect-free training samples are images of a defect-free surface of a product.

At block S42, inputting the defect-free training samples into an autoencoder of an autoencoder and pixel convolutional neural network to obtain a number of training encoding features by the autoencoder encoding the defect-free training samples.

The autoencoder can include an encoder. Each training encoding feature is a feature generated when the test sample is being encoded by the encoder of the weighted autoencoder of the weighted autoencoder and pixel convolutional neural network, namely a hidden layer feature. Each test encoding feature is an essence of the test sample, and noise of the test sample is removed. The autoencoder and pixel convolutional neural network is an architecture of the autoencoder based on the pixel convolutional neural network, namely an architecture of the autoencoder with the pixel convolutional neural network added.

At block S43, divide each of the training encoding features into a number of sub-training encoding features.

The dividing of each of the training encoding feature into a number of sub-training encoding features includes a step h1, a step h2, and a step h3. The step h1 includes determining a length of the training encoding feature. The step h2 includes obtaining a preset condition of the divisions required, the preset condition being either a preset length or a preset number. The step h3 includes dividing the length of the training encoding feature into the number of sub-training encoding features according to the preset condition.

At block S44, performing training by inputting the sub-training encoding features into a pixel convolutional neural network of the autoencoder and pixel convolutional neural network to generate a weighting of the autoencoder and pixel convolutional neural network.

The performing of training by inputting the sub-training encoding features into a pixel convolutional neural network of the autoencoder and pixel convolutional neural network to generate a weighting of the autoencoder and pixel convolutional neural network can be for example, performing training by inputting a sub-training encoding feature 1 and a sub-training encoding feature 2 into the pixel convolutional neural network of the autoencoder and pixel convolutional neural network to generate the weighting of the autoencoder and pixel convolutional neural network.

The performing of training by inputting the sub-training encoding features into a pixel convolutional neural network of the autoencoder and pixel convolutional neural network to generate a weighting of the autoencoder and pixel convolutional neural network includes a step i1 and a step i2. The step i1 includes performing training by inputting a sub-training encoding feature into a pixel convolutional neural network of the autoencoder and pixel convolutional neural network to generate a sub-weighting of the autoencoder and pixel convolutional neural network. The step i2 includes inputting the sub-weighting into the autoencoder and pixel convolutional neural network to iteratively train the autoencoder and pixel convolutional neural network according to a next sub-training encoding feature until all of the sub-training encoding features are input into the autoencoder and pixel convolutional neural network to generate the weighting of the autoencoder and pixel convolutional neural network.

For example, all of the sub-test encoding features include a sub-test encoding feature 1 and a sub-test encoding feature 2. The method trains by inputting the sub-training encoding feature 1 into the pixel convolutional neural network of the autoencoder and pixel convolutional neural network to generate a sub-weighting 1 of the autoencoder and pixel convolutional neural network. The method inputs the sub-weighting 1 into the autoencoder and pixel convolutional neural network to iteratively train the weighted autoencoder and pixel convolutional neural network according to the sub-training encoding feature 2 to generate the weighting 2 of the autoencoder and pixel convolutional neural network.

At block S45, obtaining the weighting generated when the autoencoder and pixel convolutional neural network is being trained with the defect-free training samples.

The block S45 of the second embodiment is the same as the block S31 of the first embodiment, details thereof are as the description of the block S31 of the first embodiment, and are not repeated.

At block S46, inputting the weighting into the autoencoder and pixel convolutional neural network to obtain a test encoding feature by a weighted autoencoder of the weighted autoencoder and pixel convolutional neural network encoding a test sample.

The block S46 of the second embodiment is the same as the block S32 of the first embodiment, details thereof are as the description of the block S32 of the first embodiment, and are not repeated.

At block S47, dividing the test encoding feature into a number of sub-test encoding features.

The block S47 of the second embodiment is the same as the block S33 of the first embodiment, details thereof are as the description of the block S33 of the first embodiment, and are not repeated.

At block S48, inputting the sub-test encoding feature into a weighted pixel convolution neural network of the weighted autoencoder and pixel convolutional neural network one by one to output a test result, the test result being either no defect in the test sample or at least one defect in the test sample.

The block S48 of the second embodiment is the same as the block S34 of the first embodiment, details thereof are as the description of the block S34 of the first embodiment, and are not repeated.

In the disclosure, a number of defect-free training samples are obtained, and a number of training encoding features are obtained by inputting the defect-free training samples into an autoencoder of an autoencoder and pixel convolutional neural network and the autoencoder encoding the defect-free training samples. The disclosure divides the training encoding feature into a number of sub-training encoding features. The method trains by inputting the sub-training encoding features into a pixel convolutional neural network of the autoencoder and pixel convolutional neural network to generate a weighting of the autoencoder and pixel convolutional neural network. Further, in the disclosure, a weighting generated when an autoencoder and pixel convolutional neural network is being trained with defect-free training samples is obtained. The disclosure further obtains a test encoding feature by inputting the weighting into the autoencoder and pixel convolutional neural network and encoding a test sample by a weighted autoencoder of the weighted autoencoder and pixel convolutional neural network. The disclosure divides the test encoding feature into a number of sub-test encoding features. The disclosure also inputs the sub-test encoding features into a weighted pixel convolution neural network of the weighted autoencoder and pixel convolutional neural network one by one to output a test result. The test result can be either no defect in the test sample or at least one defect in the test sample. Thus, the disclosure can generate the weighting by using the defect-free training samples according to the autoencoder, dividing the training encoding feature, and training of the pixel convolutional neural network. The disclosure can further directly use essence of the test sample to determine whether defect exists in the test sample, but does not need to directly use the test sample to so determine. The disclosure also does not need a comparison with the test sample. Thus, noise which might influence the test sample can be avoided, and an inaccurate determination of the defect can be avoided. The disclosure also divides the test encoding feature into a number of sub-test encoding features to preform testing, thus interference in the test encoding feature and an averaging of the defect information are avoided, thus fine defects can be accurately determined.

Figure 5:
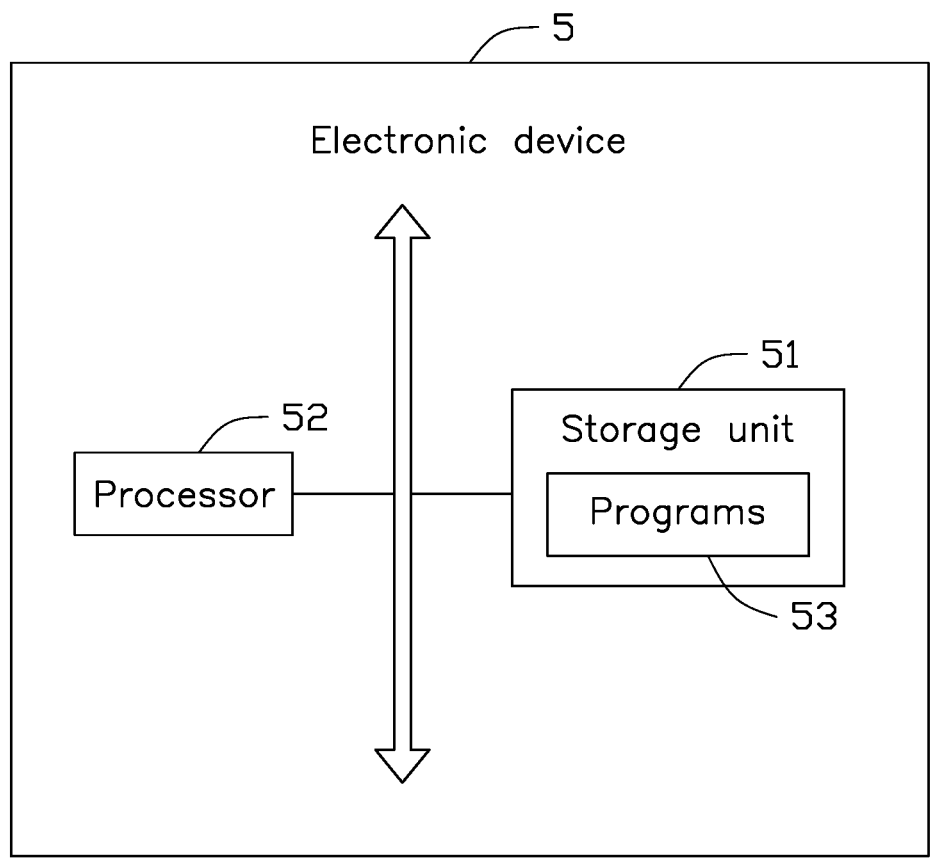
FIG. 5 illustrates a block diagram of an electronic device in an embodiment of the present disclosure.

FIG. 5 illustrates a block diagram of an electronic device in an embodiment. The electronic device 5 can include a storage unit 51, at least one processor 52, and one or more programs 53 stored in the storage unit 51 which can be run on the at least one processor 52. The at least one processor 52 can execute the one or more programs 53 to accomplish the blocks of the exemplary method. Or the at least one processor 52 can execute the one or more programs 53 to accomplish the functions of the modules of the exemplary device.

The one or more programs 53 can be divided into one or more modules/units. The one or more modules/units can be stored in the storage unit 51 and executed by the at least one processor 52 to accomplish the purpose of the method. The one or more modules/units can be a series of program command segments which can perform specific functions, and the command segment is configured to describe the execution process of the one or more programs 53 in the electronic device 5. For example, the one or more programs 53 can be divided into modules as shown in the FIG. 1 and the FIG. 2, the functions of each module are as described in the first embodiment and the second embodiment.

The electronic device 5 can be any suitable electronic device, for example, a personal computer, a tablet computer, a mobile phone, a PDA, or the like. A person skilled in the art knows that the device in FIG. 5 is only an example and is not to be considered as limiting of the electronic device 5, another electronic device 5 may include more or fewer parts than the diagram, or may combine certain parts, or include different parts, such as more buses, electronic device 5, and so on.

The at least one processor 52 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 52 can be a microprocessor or the at least one processor 52 can be any regular processor or the like. The at least one processor 52 can be a control center of the electronic device 5, using a variety of interfaces and lines to connect various parts of the entire electronic device 5.

The storage unit 51 stores the one or more programs 53 and/or modules/units. The at least one processor 52 can run or execute the one or more programs and/or modules/units stored in the storage unit 51, call out the data stored in the storage unit 51 and accomplish the various functions of the electronic device 5. The storage unit 51 may include a program area and a data area. The program area can store an operating system, and applications that are required for the at least one function, such as sound or image playback features, and so on. The data area can store data created according to the use of the electronic device 5, such as audio data, and so on. In addition, the storage unit 51 can include a non-transitory storage medium, such as hard disk, memory, plug-in hard disk, smart media card, secure digital, flash card, at least one disk storage device, flash memory, or another non-transitory storage medium.

If the integrated module/unit of the electronic device 5 is implemented in the form of or by means of a software functional unit and is sold or used as an independent product, all parts of the integrated module/unit of the electronic device 5 may be stored in a computer-readable storage medium. The electronic device 5 can use one or more programs to control the related hardware to accomplish all parts of the method of this disclosure. The one or more programs can be stored in a computer-readable storage medium. The one or more programs can apply the exemplary method when executed by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, and read-only memory.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for detecting defects comprising:
    obtaining a weighting generated when an autoencoder and pixel convolutional neural network is being trained with a plurality of defect-free training samples;
    inputting the weighting into the autoencoder and pixel convolutional neural network to obtain a test encoding feature, wherein the test encoding feature is generated after a test sample is encoded by the weighted autoencoder;
    dividing the test encoding feature into a plurality of sub-test encoding features; and
    inputting the plurality of sub-test encoding features into a weighted pixel convolution neural network of the weighted autoencoder and pixel convolutional neural network one by one to output a test result, the test result being either no defect in the test sample or at least one defect in the test sample.

2. The method according to claim 1, wherein the dividing the test encoding feature into a plurality of sub-test encoding features comprises:
    determining a length of the test encoding feature;
    obtaining a preset condition of the divisions required, the preset condition being either a preset length or a preset number;
    dividing the length of the test encoding feature into the sub-test encoding features according to the preset condition.

3. The method according to claim 1, wherein the inputting the plurality of sub-test encoding features into the weighted pixel convolution neural network of the weighted autoencoder and pixel convolutional neural network one by one to output the test result comprises:
    inputting the plurality of sub-test encoding features into the weighted pixel convolution neural network of the weighted autoencoder and pixel convolutional neural network one by one until all of the sub-test encoding features are tested completely or there is a determination that at least one defect exists in the sub-test encoding feature;
    outputting the test result.

4. The method according to claim 3, wherein the inputting the plurality of sub-test encoding features into the weighted pixel convolution neural network of the weighted autoencoder and pixel convolutional neural network one by one until all of the sub-test encoding features are tested completely or there is a determination that at least one defect exists in the sub-test encoding feature comprises:
    inputting one sub-test encoding feature into a weighted pixel convolution neural network of the weighted autoencoder and pixel convolutional neural network to output a sub-test result;
    determining whether at least one defect exists in the sub-test encoding feature according to the sub-test result;
    determining whether all of the sub-test encoding features are tested completely if no defect is found in the sub-test encoding feature;
    inputting continuously a next sub-test encoding feature into the weighted pixel convolution neural network of the weighted autoencoder and pixel convolutional neural network, determining whether at least one defect exists in the next sub-test encoding feature, and determining whether all of the sub-test encoding features are tested completely, if not all of the sub-test encoding features are tested completely, until all of the sub-test encoding features are tested completely or there is a determination that at least one defect exists in the sub-test encoding feature.

5. The method according to claim 4, wherein the method further comprises:
    outputting a test result including at least one defect in the test sample if there is a determination that at least one defect exists in the sub-test encoding feature.

6. The method according to claim 4, wherein the method further comprises:
    outputting a test result including no defect in the test sample if all of the sub-test encoding features are tested completely.

7. The method according to claim 1, wherein the method further comprises:
    obtaining a plurality of defect-free training samples;
    inputting the defect-free training samples into an autoencoder of the autoencoder and pixel convolutional neural network to obtain a plurality of training encoding features by the autoencoder encoding the defect-free training samples;
    dividing each of the training encoding features into a plurality of sub-training encoding features;
    performing training by inputting the plurality of sub-training encoding features into a pixel convolutional neural network of the autoencoder and pixel convolutional neural network to generate the weighting of the autoencoder and pixel convolutional neural network.

8. An electronic device comprising:
    a storage device;
    at least one processor; and
    the storage device storing one or more programs, which when executed by the at least one processor, cause the at least one processor to:

obtain a weighting generated when an autoencoder and pixel convolutional neural network is being trained with a plurality of defect-free training samples;

input the weighting into the autoencoder and pixel convolutional neural network to obtain a test encoding feature, wherein the test encoding feature is generated after a test sample is encoded by the weighted autoencoder;

divide the test encoding feature into a plurality of sub-test encoding features; and input the plurality of sub-test encoding features into a weighted pixel convolution neural network of the weighted autoencoder and pixel convolutional neural network one by one to output a test result, the test result being either no defect in the test sample or at least one defect in the test sample.

9. The electronic device according to claim 8, further causing the at least one processor to:
determine a length of the test encoding feature;
obtain a preset condition of the divisions required, the preset condition being either a preset length or a preset number;
divide the length of the test encoding feature into the sub-test encoding features according to the preset condition.

10. The electronic device according to claim 8, further causing the at least one processor to:
input the plurality of sub-test encoding features into the weighted pixel convolution neural network of the weighted autoencoder and pixel convolutional neural network one by one until all of the sub-test encoding features are tested completely or there is a determination that at least one defect exists in the sub-test encoding feature;
output the test result.

11. The electronic device according to claim 10, further causing the at least one processor to:
input one sub-test encoding feature into a weighted pixel convolution neural network of the weighted autoencoder and pixel convolutional neural network to output a sub-test result;
determine whether at least sone defect exists in the sub-test encoding feature according to the sub-test result;
determine whether all of the sub-test encoding features are tested completely if no defect is found in the sub-test encoding feature;
input continuously a next sub-test encoding feature into the weighted pixel convolution neural network of the weighted autoencoder and pixel convolutional neural network, determining whether at least one defect exists in the next sub-test encoding feature, and determining whether all of the sub-test encoding features are tested completely, if not all of the sub-test encoding features are tested completely, until all of the sub-test encoding features are tested completely or there is a determination that at least one defect exists in the sub-test encoding feature.

12. The electronic device according to claim 11, further causing the at least one processor to:
output a test result including at least one defect in the test sample if there is a determination that at least one defect exists in the sub-test encoding feature.

13. The electronic device according to claim 11, further causing the at least one processor to:

output a test result including no defect in the test sample if all of the sub-test encoding features are tested completely.

14. The electronic device according to claim 8, further causing the at least one processor to:
obtain a plurality of defect-free training samples;
input the defect-free training samples into an autoencoder of the autoencoder and pixel convolutional neural network to obtain a plurality of training encoding features by the autoencoder encoding the defect-free training samples;
divide each of the training encoding features into a plurality of sub-training encoding features;
perform training by inputting the plurality of sub-training encoding features into a pixel convolutional neural network of the autoencoder and pixel convolutional neural network to generate the weighting of the autoencoder and the pixel convolutional neural network.

15. A non-transitory storage medium storing a set of commands, when the commands being executed by at least one processor of an electronic device, causing the at least one processor to:
obtain a weighting generated when an autoencoder and pixel convolutional neural network is being trained with a plurality of defect-free training samples;
input the weighting into the autoencoder and pixel convolutional neural network to obtain a test encoding feature, wherein the test encoding feature is generated after a test sample is encoded by the weighted autoencoder;
divide the test encoding feature into a plurality of sub-test encoding features; and
input the plurality of sub-test encoding features into a weighted pixel convolution neural network of the weighted autoencoder and pixel convolutional neural network one by one to output a test result, the test result being either no defect in the test sample or at least one defect in the test sample.

16. The non-transitory storage medium according to claim 15, further causing the at least one processor to:
determine a length of the test encoding feature;
obtain a preset condition of the divisions required, the preset condition being either a preset length or a preset number;
divide the length of the test encoding feature into the sub-test encoding features according to the preset condition.

17. The non-transitory storage medium according to claim 15, further causing the at least one processor to:
input the plurality of sub-test encoding features into the weighted pixel convolution neural network of the weighted autoencoder and pixel convolutional neural network one by one until all of the sub-test encoding features are tested completely or there is a determination that at least one defect exists in the sub-test encoding feature;
output the test result.

18. The non-transitory storage medium according to claim 17, further causing the at least one processor to:
input one sub-test encoding feature into a weighted pixel convolution neural network of the weighted autoencoder and pixel convolutional neural network to output a sub-test result;
determine whether at least one defect exists in the sub-test encoding feature according to the sub-test result;

determine whether all of the sub-test encoding features are tested completely if no defect is found in the sub-test encoding feature;

input continuously a next sub-test encoding feature into the weighted pixel convolution neural network of the weighted autoencoder and pixel convolutional neural network, determining whether at least one defect exists in the next sub-test encoding feature, and determining whether all of the sub-test encoding features are tested completely, if not all of the sub-test encoding features are tested completely, until all of the sub-test encoding features are tested completely or there is a determination that at least one defect exists in the sub-test encoding feature.

19. The non-transitory storage medium according to claim 18, further causing the at least one processor to:

output a test result including at least one defect in the test sample if there is a determination that at least one defect exists in the sub-test encoding feature.

20. The non-transitory storage medium according to claim 15, further causing the at least one processor to:

obtain a plurality of defect-free training samples;

input the defect-free training samples into an autoencoder of the autoencoder and pixel convolutional neural network to obtain a plurality of training encoding features by the autoencoder encoding the defect-free training samples;

divide each of the training encoding features into a plurality of sub-training encoding features;

perform training by inputting the plurality of sub-training encoding features into a pixel convolutional neural network of the autoencoder and pixel convolutional neural network to generate the weighting of the autoencoder and pixel convolutional neural network.

* * * * *